(12) United States Patent
Lyuh et al.

(10) Patent No.: US 7,958,179 B2
(45) Date of Patent: Jun. 7, 2011

(54) ARITHMETIC METHOD AND DEVICE OF RECONFIGURABLE PROCESSOR

(75) Inventors: Chun Gi Lyuh, Daejeon (KR); Soon Il Yeo, Daejeon (KR); Tae Moon Roh, Daejeon (KR); Jong Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 889 days.

(21) Appl. No.: 11/978,878

(22) Filed: Oct. 30, 2007

(65) Prior Publication Data

US 2008/0140745 A1  Jun. 12, 2008

(30) Foreign Application Priority Data

Dec. 6, 2006 (KR) .................. 10-2006-0122907
May 15, 2007 (KR) .................. 10-2007-0046833

(51) Int. Cl.
*G06F 7/38* (2006.01)
(52) U.S. Cl. ............................... 708/490; 708/523
(58) Field of Classification Search .................. 708/790, 708/523–524
See application file for complete search history.

(56) References Cited

U.S. PATENT DOCUMENTS

| 5,241,492 A * | 8/1993 | Girardeau, Jr. ............... 708/523 |
| 5,991,785 A * | 11/1999 | Alidina et al. ................ 708/524 |
| 6,014,683 A * | 1/2000 | Katsuta ........................ 708/490 |
| 6,779,013 B2 | 8/2004 | Pangal |
| 2005/0144215 A1 | 6/2005 | Simkins et al. |

FOREIGN PATENT DOCUMENTS

| JP | 07-073163 A | 3/1995 |
| KR | 10-0284402 | 12/2000 |
| KR | 10-2006-0088689 | 8/2006 |
| WO | WO 2005/017765 | 2/2005 |

* cited by examiner

*Primary Examiner* — Tan V Mai
(74) *Attorney, Agent, or Firm* — Blakely, Sokoloff, Taylor & Zafman LLP

(57) ABSTRACT

Provided are an arithmetic method and device of a reconfigurable processor. The arithmetic device includes: an Arithmetic Logic Unit (ALU) for performing an addition and subtraction operation and a logic operation of a binary signal; a multiplier for performing a multiplication operation of the binary signal; a shifter for changing an arrangement of the binary signal; a first operand selector and a second operand selector each for selecting one of values output from the ALU, the multiplier, and the shifter; and an adder for adding the values selected by the first operand selector and the second operand selector.

11 Claims, 4 Drawing Sheets

ARITHMETIC METHOD AND DEVICE OF RECONFIGURABLE PROCESSOR

CROSS-REFERENCE TO RELATED APPLICATION

This application claims priority to and the benefit of Korean Patent Application Nos. 2006-122907, filed Dec. 6, 2006 and 2007-46833, filed May 15, 2007, the disclosures of which are incorporated herein by reference in their entirety.

BACKGROUND

1. Field of the Invention

The present invention relates to an arithmetic method and device of a reconfigurable processor.

The present invention has been produced from the work supported by the IT R&D program of MIC (Ministry of Information and Communication)/IITA (Institute for Information Technology Advancement) [2005-S-073-02, Development of semiconductor circuit design based on the nano-scaled device] in Korea.

2. Discussion of Related Art

A reconfigurable processor reconfigures an operation according to an application and performs a large amount of operations. The structure of an arithmetic unit used in the reconfigurable processor is similar to that used in a general processor, a digital signal processor, and so on. However, the reconfigurable processor must be able to efficiently perform a variety of operations so that it can be used in various applications.

The present invention has been produced from the work supported by the IT R&D program of MIC (Ministry of Information and Communication)/IITA (Institute for Information Technology Advancement) [2005-S-073-02, Development of semiconductor circuit design based on the nano-scaled device] in Korea.

Such a reconfigurable processor comprises an Arithmetic Logic Unit (ALU) and a multiplier, each including an adder. However, in this structure, an operation result of the ALU must pass through an accumulator to be stored in a memory. In addition, an adder used in the ALU is generally used only for addition/subtraction and a final addition operation for multiplication, and thus the usage of use of the adder, which may cause a large amount of delay, is low.

SUMMARY OF THE INVENTION

The present invention is directed to an arithmetic method and device of a reconfigurable processor.

The present invention is also directed to making an adder select a result of an Arithmetic Logic Unit (ALU), a multiplier and a shifter to perform an addition operation, storing the operation result of the adder in an accumulator as well as a register file, and thereby increasing the operation performance and the operation efficiency of a reconfigurable processor that reconfigures and performs a large amount of operations according to various applications.

One aspect of the present invention provides an arithmetic device of a reconfigurable processor, comprising: an ALU for performing an addition and subtraction operation and a logic operation of a binary signal; a multiplier for performing a multiplication operation of the binary signal; a shifter for changing an arrangement of the binary signal; a first operand selector and a second operand selector each for selecting one of values output from the ALU, the multiplier, and the shifter; and an adder for adding the values selected by the first operand selector and the second operand selector.

The arithmetic device may further comprise: a status register for storing a status value of a value output from the adder; and an accumulator for storing the value output from the adder. The ALU may output a result of the arithmetic and logic operation in combination with the adder. The multiplier may output a result of the multiplication operation in combination with the adder.

In addition, the first operand selector may further receive an immediate value directly input from a command system and select it. The multiplier may further receive an operator required for the multiplication operation and the value stored in the accumulator. The second operand selector may further receive the value stored in the accumulator and select it.

Another aspect of the present invention provides a method of performing an operation using a reconfigurable processor, comprising the steps of: (a) receiving a binary signal required for the processor's operation; (b) performing an arithmetic and logic operation, a multiplication operation and a shift operation using the received binary signal; (c) selecting at least 2 result values calculated in step (b) as first and second operands in parallel according to a processor control command; and (d) adding the selected first and second operands to output a final operation result.

In step (b), the arithmetic and logic operation and the multiplication operation each may be completed when the addition operation is performed in step (d). The result value output in step (d) may be temporarily stored and input as an operand in an operation of step (b). When a final addition operation is performed in step (d), a carry may be input.

Still another aspect of the present invention provides an arithmetic device of a reconfigurable processor, comprising: an input ALU to which first and second operands are respectively input through a wire; a multiplier; a shifter; a first operand selector to which a first output of the ALU, a first output of the multiplier, a first output of the shifter and an immediate value input from outside are input through a wire; a second operand selector to which a second output of the ALU, a second output of the multiplier and an output of an accumulator are input through a wire; a carry input selector to which a third output of the multiplier and a second output of the shifter are input through a wire; an adder to which outputs of the first and second operand selectors and the carry input selector are input through a wire; and the accumulator and a register to which an output of the adder is input through a wire.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
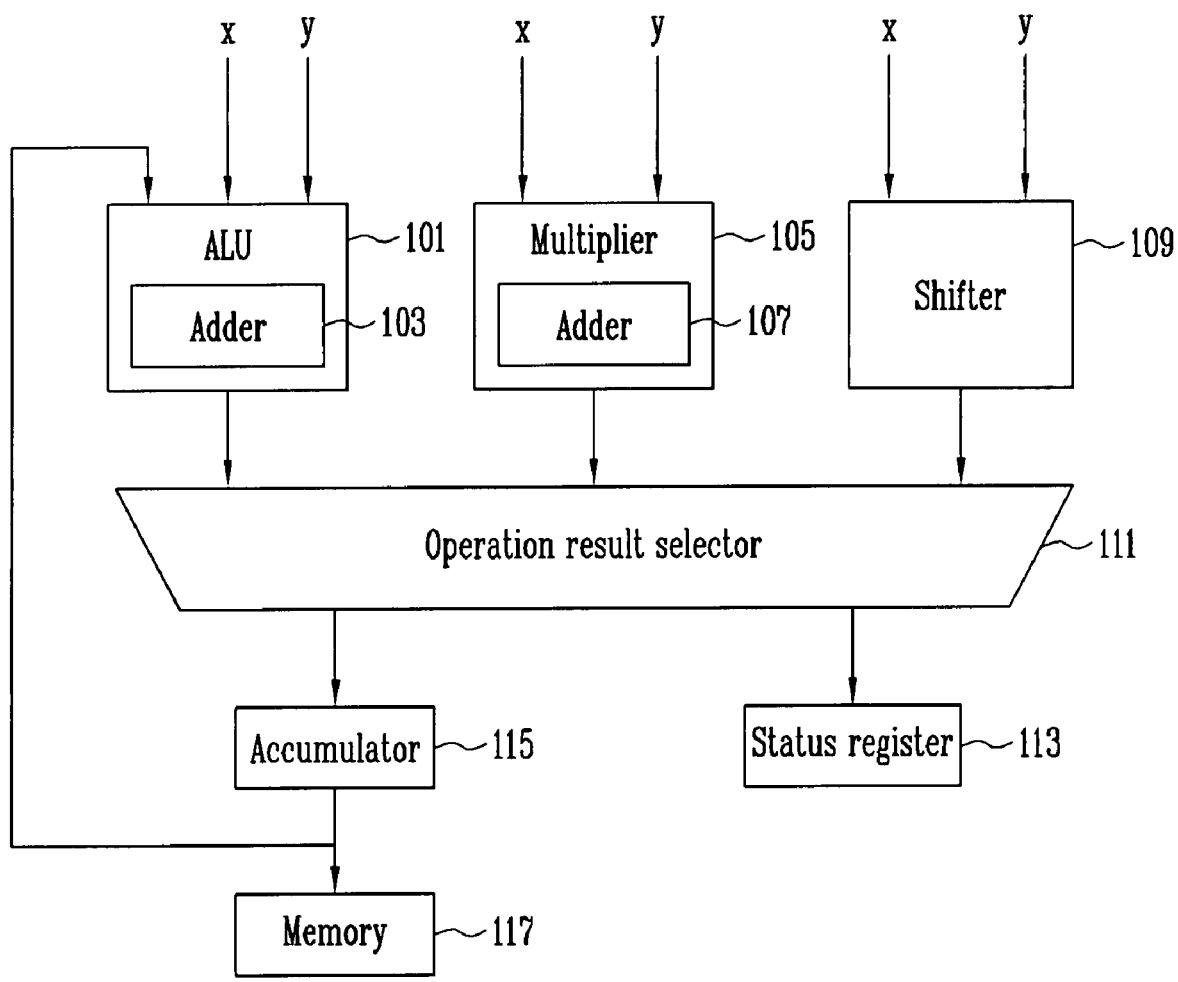
FIG. 1 is a schematic block diagram of a conventional arithmetic device of a reconfigurable processor compared with the present invention.

FIG. 1 is a schematic block diagram of a conventional arithmetic device of a reconfigurable processor compared with the present invention.

Referring to FIG. 1, the conventional arithmetic device comprises an Arithmetic Logic Unit (ALU) 101, a multiplier 105, a shifter 109, an operation result selector 111, a status register 113, an accumulator 115, and a memory 117.

First, when operands (x, y) are input to the arithmetic device, they are input to the ALU 101, the multiplier 105 and the shifter 109 according to a command of a processor control device.

After the respective arithmetic units complete their calculation, an operation result is selected from the respective operation results by the operation result selector 111. The selected operation result may be stored in the accumulator 115, and the operation result stored in the accumulator 115 may be transferred back to the ALU 101 so that a Multiply and Accumulate (MAC) operation can be performed.

In addition, a status value of an operation result value may be stored in the status register 113, and a final operation result value is stored in the memory 117.

In such a conventional arithmetic device, as illustrated in the drawing, adders 103 and 107 are used in both of the ALU 101 and the multiplier 105. However, in the same bit operation, a plurality of the same adders 103 and 107 are used.

Figure 2:
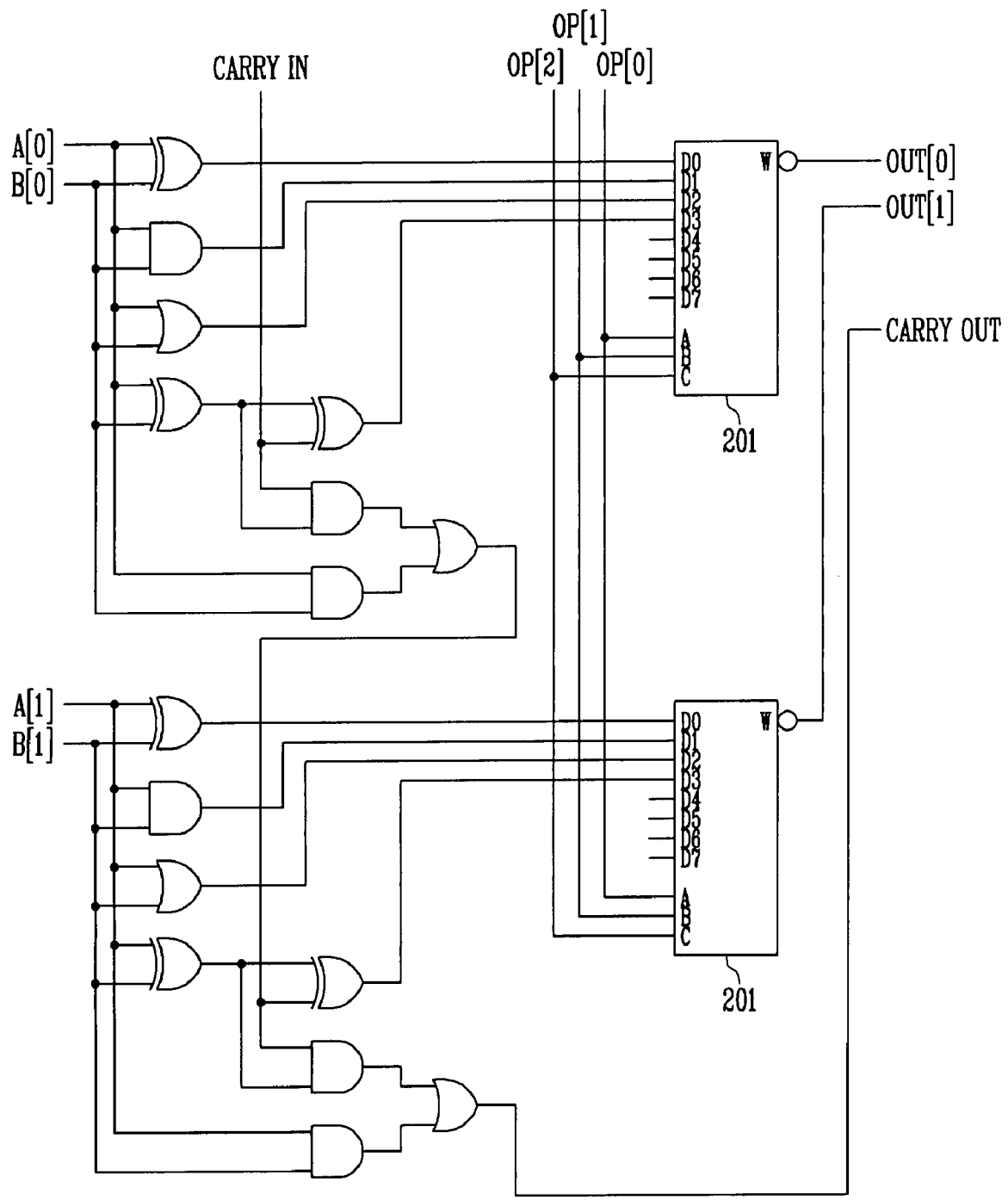
FIG. 2 shows a constitution of a simple 2-bit Arithmetic Logic Unit (ALU) for describing an adder included in the ALU.

FIG. 2 shows a constitution of a simple 2-bit ALU for describing an adder included in the ALU.

Referring to FIG. 2, the ALU has a structure for a simple 2-bit arithmetic and logic operation. The drawing is not for describing the ALU itself but just for describing that an adder must be included in the ALU for a final operation. Since the drawing is a simple logic structure that those skilled in the art can understand, a detailed description of signal flow in the drawing will be omitted.

As illustrated in FIG. 2, the ALU has a structure that receives 2-bit input operands A[0,1] and B[0,1] and outputs OUT[0,1]. The most important part of the drawing is an adder 201. The adder 201 serves to add signals output through an OR operation, an AND operation, an exclusive-AND operation, etc., and output a final result.

As in the example shown in the drawing, such an adder is always applied in the same way, even when bits more complex than 2 bits are input for an arithmetic and logic operation.

Therefore, an adder must be always included for a final operation of the ALU.

Figure 3:
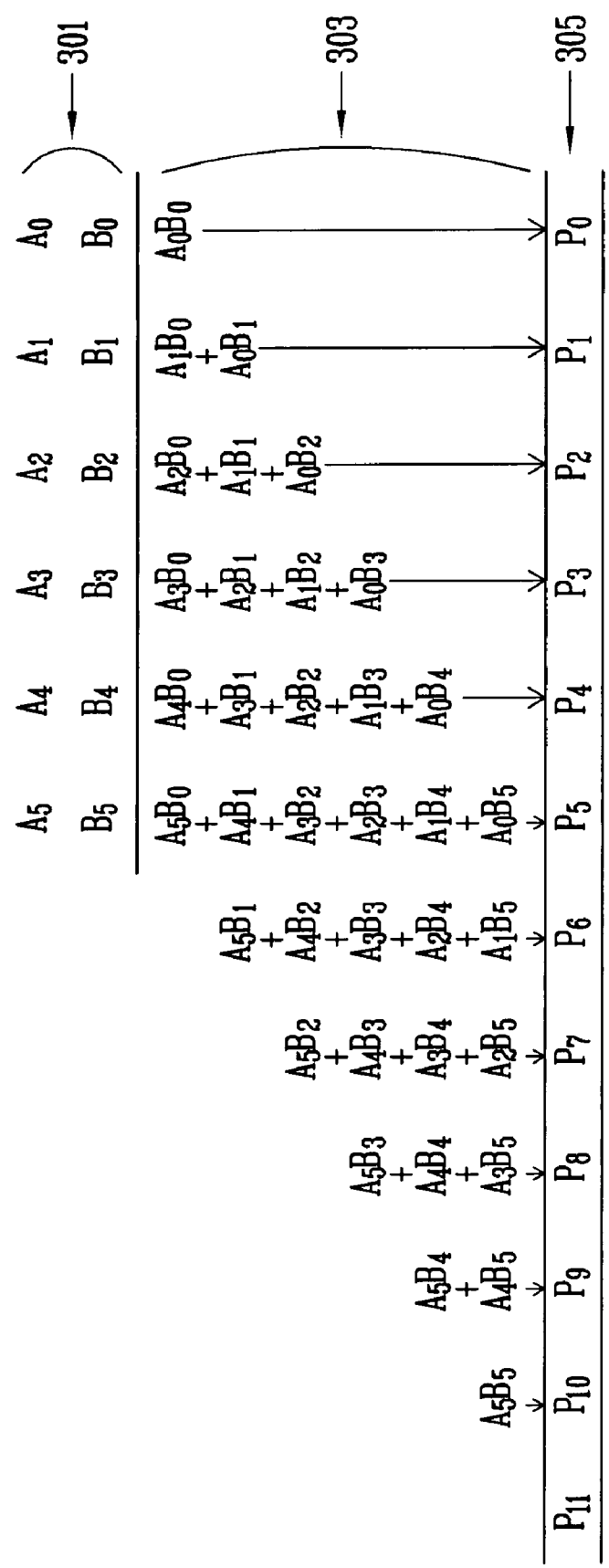
FIG. 3 is a conceptual diagram showing a multiplication method of a multiplier for describing an adder included in the multiplier.

FIG. 3 is a conceptual diagram showing a multiplication method of a multiplier for describing an adder included in the multiplier.

Referring to FIG. 3, a method of multiplying a 6-bit operand by another 6-bit operand is conceptually illustrated. According to the multiplication method, in order to perform an operation of 6-bit operands A and B 301, the respective bits of A are multiplied by respective bits of B, and the results 303 are arranged in an order of a cipher. Subsequently, all values existing in each column of all the rows are added up, and thereby final result values 305 are obtained. Thus, when multiplication is performed in this way, an adder is necessary to obtain the final multiplication result values.

Basically, the multiplier of a processor performs the multiplication according the above method. To efficiently obtain final result values from the results 303 arranged in an order of cipher, a lot of methods, such as booth encoding, etc., have been developed, but still an adder must be used to finish the multiplication operation.

Figure 4:
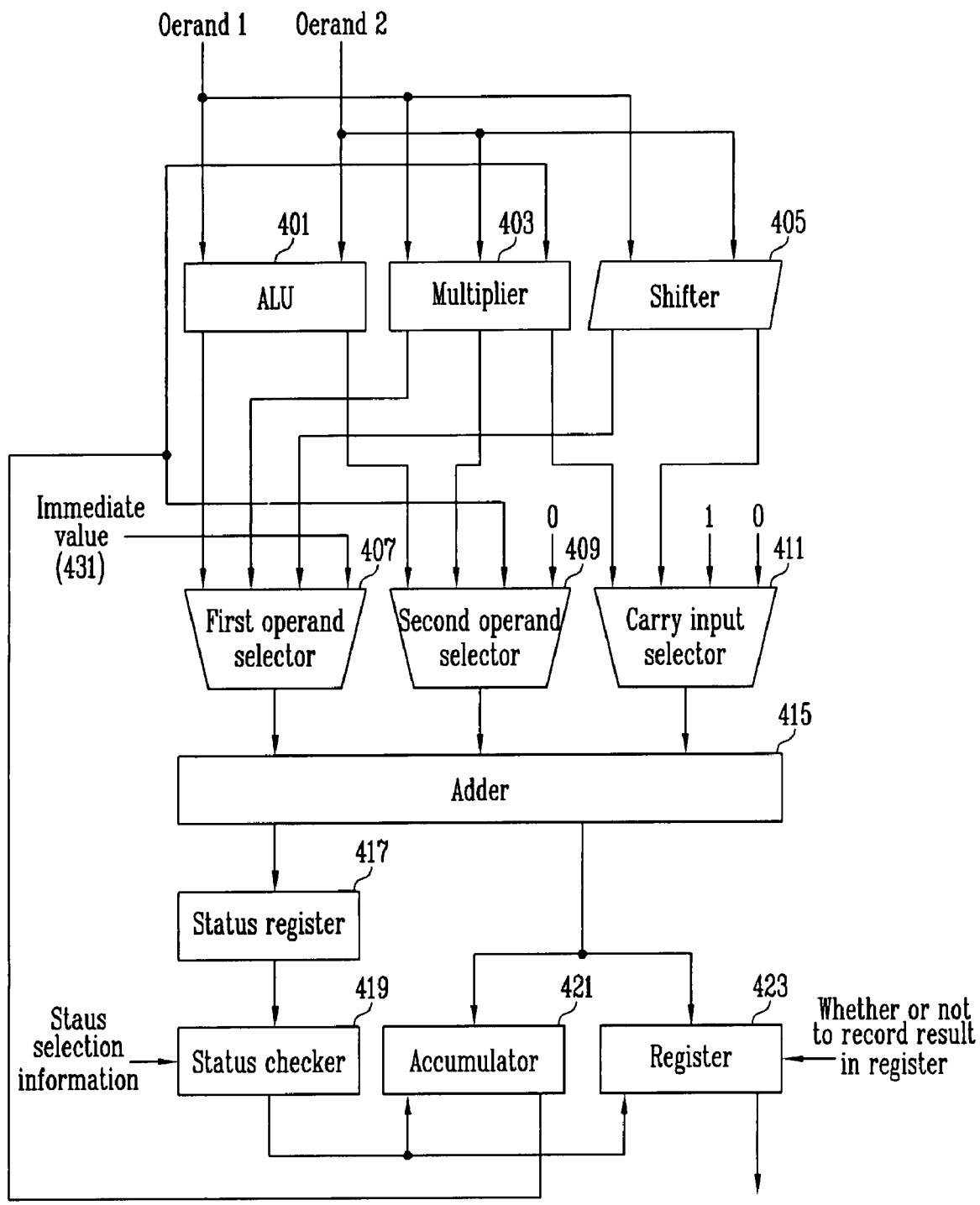
FIG. 4 is a schematic block diagram of an arithmetic device of a reconfigurable processor according to an exemplary embodiment of the present invention.

FIG. 4 is a schematic block diagram of an arithmetic device of a reconfigurable processor according to an exemplary embodiment of the present invention.

Referring to FIG. 4, the arithmetic device according to an exemplary embodiment of the present invention comprises an ALU 401, a multiplier 403, a shifter 405, a first operand selector 407, a second operand selector 409, a carry input selector 411, an adder 415, a status register 417, a status checker 419, an accumulator 421 and a register 423.

Like a conventional device, the ALU 401 performs an arithmetic operation and a logic operation using an input operand, but does not comprise the final adder described with reference to FIG. 2.

The multiplier 403 also performs a multiplication operation using the input operand but, unlike a conventional device, does not comprise the final adder described with reference to FIG. 3.

The shifter 405 receives the operand and performs a shift operation that moves a bit of the operand.

The first operand selector 407 and the second operand selector 409 serve to select an input needed for the adder 415 among input signals received from the ALU 401, the multiplier 403 and the shifter 405 and an immediate value 431 directly input from a processor controller.

In particular, the first operand selector 407 serves to receive the 4 signals of the ALU 401, the multiplier 403, the shifter 405 and the immediate value 431 and select one of them as an output signal.

The second operand selector 409 serves to select and output one signal among the signals of the ALU 401 and the multiplier 403 and a signal fed back from the accumulator 421.

Signals input to the first and second operand selectors 407 and 409 are not the same as each other even when they are output from the same ALU 401, the same multiplier 403 and the same shifter 405.

The carry input selector 411 serves to select and output one of signals input from the shifter 405 and the multiplier 403. Such a carry signal allows the adder 415 to perform subtraction as well as addition.

The adder 415 serves to receive the selected signals from the first operand selector 407, the second operand selector 409 and the carry input selector 411 and perform an addition operation. The adder 415 can serve as a final adder included in the ALU 401 and the multiplier 403 illustrated in FIGS. 2 and 3. In addition, the adder 415 receives the signal of the carry input selector 411, thereby enabling an efficient operation.

The status register 417 serves to store the status value of a value output from the adder 415. The status checker 419 identifies the status value stored in the status register 417 in response to a status selection signal, and determines whether or not to feed back the stored value to the accumulator 421 or the register 423.

The accumulator 421 serves to temporarily store the addition result value in order to perform the MAC operation, etc., which are frequently used in the processor. The register 423 stores the calculation result value in response to an external register record signal. Here, when an operation can be performed using only the value stored in the accumulator 421, it is possible to save the memory of the register 423.

The arithmetic device constituted as above according to an exemplary embodiment of the present invention omits a final addition operation in the multiplier 403 and the ALU 401. Thus, with neither inputting the result of a general multiplier back to an adder nor adding it to a previous result to perform the MAC operation in the multiplier, the multiplier 403 itself receives and directly inputs an already fed-back previous result value into a carry-save-addition operation performed in the multiplier 403, thereby performing the MAC operation.

In many applications, the shifter 405 frequently rounds off a value to an integer when a division operation is performed. Here, before dividing the value by $2^n$ using the shift operation, a conventional arithmetic device adds $2^{(n-1)}$ to the value and then performs the shift operation. Thus, the conventional arithmetic device performs several operation steps. However, in the arithmetic device according to an exemplary embodiment of the present invention, the adder 415 is connected behind the shifter 405. Thus, an operation result of the shifter 405 and a carry result are directly input to the adder 415, so that a result can be immediately obtained.

According to the present invention, it is possible to provide an arithmetic method and device of a reconfigurable processor.

In addition, an adder selects a result of an ALU, a multiplier and a shifter to perform an addition operation, the operation result of the adder is stored in an accumulator as well as a register file, and thereby it is possible to increase the operation performance and the operation efficiency of the reconfigurable processor that reconfigures and performs a large amount of operations according to various applications.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An arithmetic device of a reconfigurable processor, comprising:
    an Arithmetic Logic Unit (ALU) for performing an addition and subtraction operation and a logic operation of a binary signal;
    a multiplier for performing a multiplication operation of the binary signal;
    a shifter for changing an arrangement of the binary signal;
    a first operand selector and a second operand selector, each for selecting one of values output from the ALU, the multiplier and the shifter; and
    an adder for adding the values selected by the first operand selector and the second operand selector.

2. The arithmetic device of claim 1, further comprising:
    a status register for storing a status value of a value output from the adder; and
    an accumulator for storing the value output from the adder.

3. The arithmetic device of claim 2, wherein the multiplier further receives an operator required for the multiplication operation and the value stored in the accumulator.

4. The arithmetic device of claim 2, wherein the second operand selector further receives the value stored in the accumulator and selects it.

5. The arithmetic device of claim 1, wherein the ALU outputs a result of the arithmetic and logic operation in combination with the adder.

6. The arithmetic device of claim 1, wherein the multiplier outputs a result of the multiplication operation in combination with the adder.

7. The arithmetic device of claim 1, wherein the first operand selector further receives an immediate value directly input from a command system and selects it.

8. A method of performing an operation using a reconfigurable processor, comprising the steps of:
    (a) receiving a binary signal required for the processor's operation;
    (b) performing an arithmetic and logic operation, a multiplication operation and a shift operation using the received binary signal;
    (c) selecting at least 2 result values calculated in step (b) as first and second operands in parallel according to a processor control command; and
    (d) adding the selected first and second operands to output a final operation result.

9. The arithmetic method of claim 8, wherein each of the arithmetic and logic operation and the multiplication operation in the step (b) is completed through the addition operation in the step (d).

10. The arithmetic method of claim 8, wherein the final operation result in the step (d) is temporarily stored and input as an operand in one of the operations of the step (b).

11. The arithmetic method of claim 8, wherein a carry is input in step (d).

* * * * *